(12) United States Patent
Tsai et al.

(10) Patent No.: US 7,826,858 B2
(45) Date of Patent: Nov. 2, 2010

(54) PROTECTED PAGING INDICATION MECHANISM WITHIN WIRELESS NETWORKS

(75) Inventors: JR-Shian Tsai, Beaverton, OR (US);
Jesse R. Walker, Portland, OR (US);
Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1147 days.

(21) Appl. No.: 11/457,111

(22) Filed: Jul. 12, 2006

(65) Prior Publication Data

US 2008/0014882 A1    Jan. 17, 2008

(51) Int. Cl.
*H04Q 7/20* (2006.01)
(52) U.S. Cl. .................... 455/458; 455/574; 455/426.1; 370/328
(58) Field of Classification Search ................ 455/458, 455/574, 426.1; 370/328
See application file for complete search history.

(56) References Cited

U.S. PATENT DOCUMENTS

| 5,798,708 | A | 8/1998 | Katayama |
| 5,892,456 | A | 4/1999 | Ishida |
| 6,889,067 | B2 * | 5/2005 | Willey ..................... 455/574 |
| 7,583,702 | B2 * | 9/2009 | Liang et al. ................ 370/483 |
| 2001/0018343 | A1 * | 8/2001 | Nakata ...................... 455/426 |
| 2005/0117553 | A1 | 6/2005 | Wang et al. |
| 2005/0181767 | A1 | 8/2005 | Boland et al. |
| 2006/0098718 | A1 * | 5/2006 | Sarkar et al. ................ 375/147 |

FOREIGN PATENT DOCUMENTS

EP    1 515 575  A1    3/2005

* cited by examiner

*Primary Examiner*—Danh C Le
(74) *Attorney, Agent, or Firm*—Schwabe, Williamson & Wyatt, P.C.

(57) ABSTRACT

Embodiments of the present invention provide methods and apparatus for a protected paging indication mechanism within wireless networks. Other embodiments may be described and claimed.

20 Claims, 6 Drawing Sheets

PROTECTED PAGING INDICATION MECHANISM WITHIN WIRELESS NETWORKS

TECHNICAL FIELD

Embodiments of the present invention relate to the field of wireless networks, and more particularly, to a protected paging indication mechanism within wireless networks.

BACKGROUND

As paging for mobile devices within a wireless network is being introduced, it is important for paging indication messages to have forgery protection. Additionally, when mobile devices are in a power-saving mode (i.e. they are idle, also referred to as being in a paging mode), it is important for the mobile device to be able to efficiently determine whether or not it is being paged when it is within the idle mode without doing deep paging indication message processing.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide a protected paging indication mechanism within wireless networks.

Figure 1:
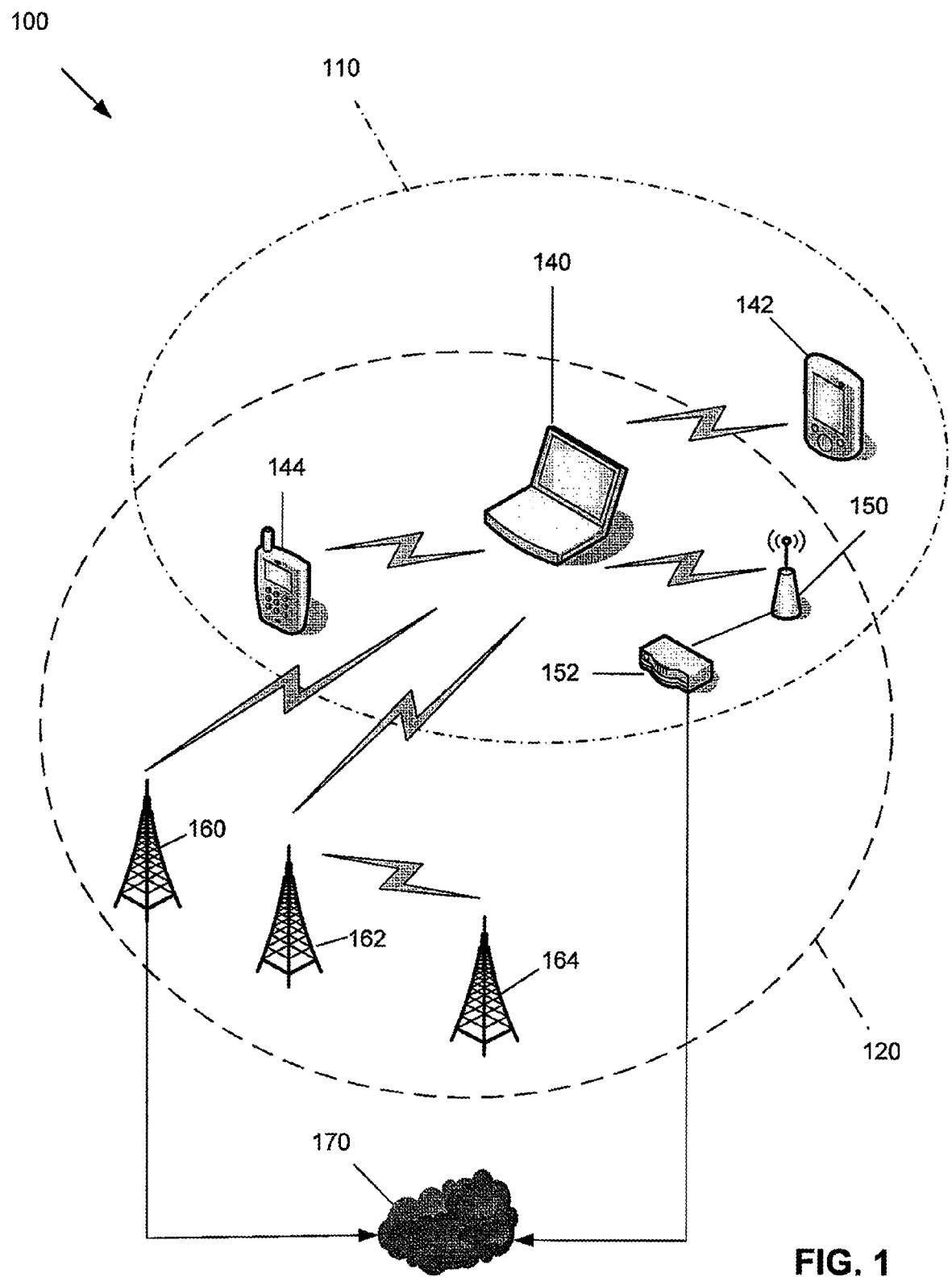
FIG. 1 is a schematic diagram representation of an example wireless communication system in accordance with various embodiments of the present invention.

Referring to FIG. 1, an example wireless communication system 100 may include one or more wireless communication networks, generally shown as 110 and 120. In particular, the wireless communication system 100 may include a wireless local area network (WLAN) 110, and a wireless metropolitan area network (WMAN) 120. Although FIG. 1 depicts two wireless communication networks, the wireless communication system 100 may include additional or fewer wireless communication networks. For example, the wireless communication network 100 may include more or less WLANs, and/or WMANs. The methods and apparatus described herein are not limited in this regard.

The wireless communication system 100 may also include one or more mobile devices, also referred to as subscriber stations, generally shown as 140, 142 and 144. For example, the subscriber stations 140, 142 and 144 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a global positioning satellite (GPS) device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts three subscriber stations, the wireless communication system 100 may include more or less subscriber stations.

The subscriber stations 140, 142 and 144 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links.

In one example, the laptop computer 140 may use direct sequence spread spectrum (DSSS) modulation and/or frequency hopping spread spectrum (FHSS) modulation to implement the WLAN 110 (e.g., modulations in accordance with any one of the 802.11 family of standards developed by the Institute of Electrical and Electronic Engineers (IEEE) and/or variations and evolutions of these standards). For example, the laptop computer 140 may communicate with devices associated with the WLAN 110 such as the handheld computer 142 and/or the smart phone 144 via wireless links. The laptop computer 140 may also communicate with an access point (AP) 150 via a wireless link. Generally, WLANs and WMANs include multiple APs 150. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 120. For example, the laptop computer 140 may operate in accordance with the 802.16 family of standards developed by IEEE to provide for fixed, portable, and/or mobile broadband wireless access (BWA) networks (e.g., the IEEE std. 802.16, published by IEEE 2004) to communicate with base stations, generally shown as 160, 162, and 164, via wireless link(s).

Although some of the above examples are described with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 110 and WMAN 120 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 110 may be operatively coupled to the common public or private network 170 via an AP 150 and/or the router 152. In another example, the WMAN 120 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Although FIG. 1 depicts a WLAN, and a WMAN, the wireless communication system 100 may include other combinations of WLANs, WMANs, and/or WWANs. The methods and apparatus described herein are not limited in this regard.

The wireless communication system 100 may include other WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

In accordance with various embodiments of the present invention, a paging service and mobile subscriber station (STA) each comprise an omnidirectional antenna, a control block, a transmit block operatively coupled to the control block and antenna, and a receive block operatively coupled to the control block and antenna. At least the transmit block and receive block may be part of a transceiver having at least one common component. Within at least the STA, the transmit and receive blocks comprise components implementing a medium access control (MAC) layer and a Physical (PHY) layer of a communication model. The STA may enter and exit a paging mode by the control block powering at least some or all of the components implementing the MAC and/or PHY layers off and on.

A process, in accordance with various embodiments of the present invention, provides that once the STA completes association (first contact) with an extended service set (ESS), a network authentication server (NAS) distributes a mobile station key (MSK) to a paging service. The paging service may be implemented in an AP or a separate network entity. The paging service and the STA derive a Service Pairwise Key (SPK) from the MSK. Alternatively, bits of a cached pre-shared key (PSK) may be used. The SPK may be generated via a key derivation function with, for example, bits 256-511 of the MSK, the MAC address of the STA, a paging service identifier, and the length of the key. In accordance with various embodiments of the present invention, the paging service and the STA generate an Integrity Pairwise Temporal Key (IPTK) from the SPK. The IPTK may be generated via a key derivation function with the SPK, a paging service, a random number A generated at the STA, a random number B generated at the paging service, and a length of the key.

In accordance with various embodiments of the present invention, when a STA within the network enters a paging mode, the STA may temporarily or partially "awaken" prior to a paging interval (advertised or otherwise made known e.g. by a paging service) during which paging indication messages (PIM) are broadcast from the paging service, sometimes through an access point (AP). The STA is then ready for being paged by the paging service when there are incoming packets of information for the STA, some entity is paging the STA and/or some entity wants to contact or communicate with the STA.

Figure 2:
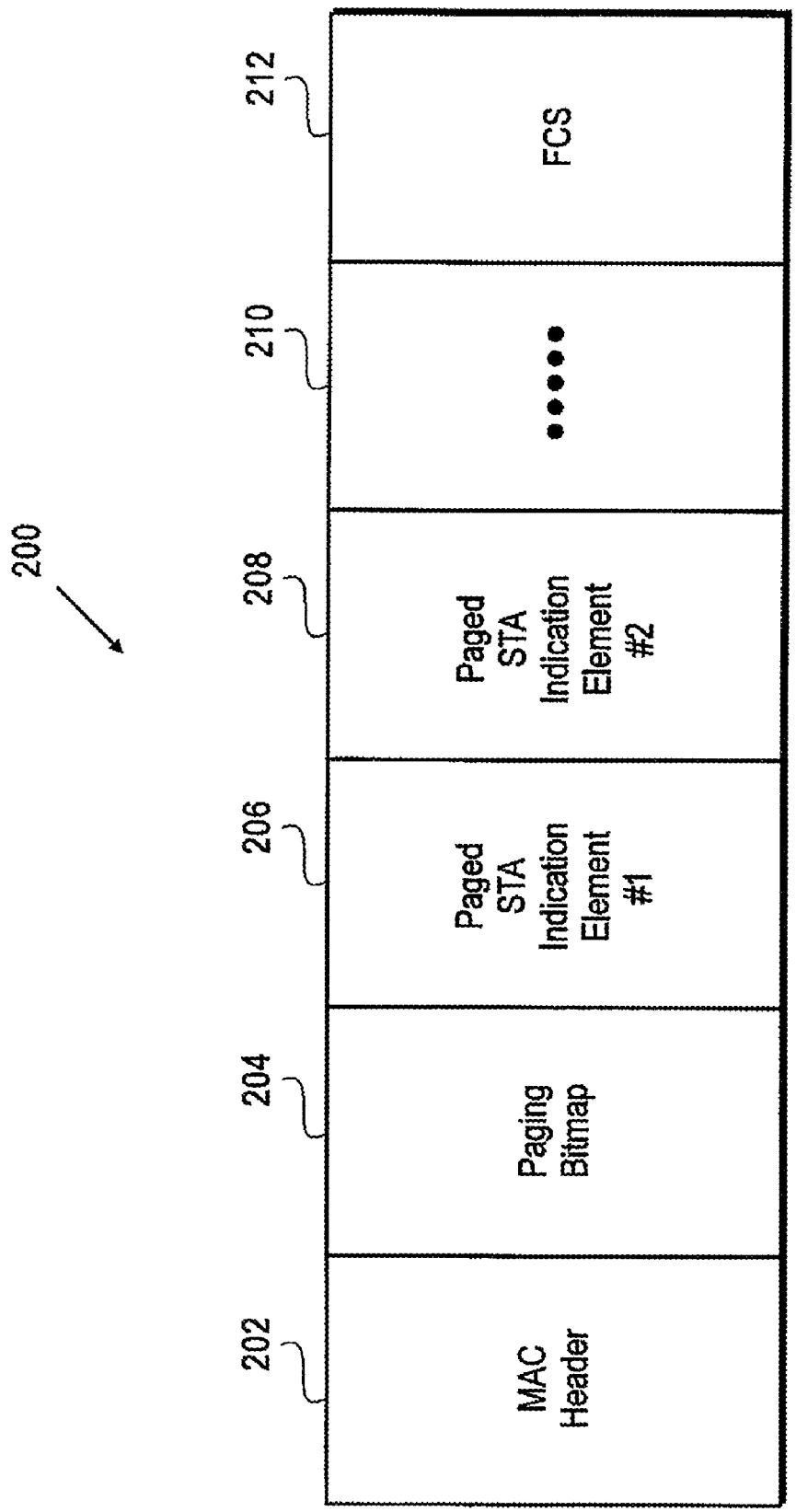
FIG. 2 is schematic diagram representation for a frame body of paging indication message for a wireless network in accordance with various embodiments of the present invention.

FIG. 2 illustrates an example of a frame body for a paging indication message 200 in accordance with various embodiments of the present invention. As may be seen, the body includes a field 202 for the MAC header, a field 204 for a paging bitmap, a plurality of fields 206, 208, 210 for paged station indication elements, and a frame check sequence field (FCS) 212.

Figure 3:
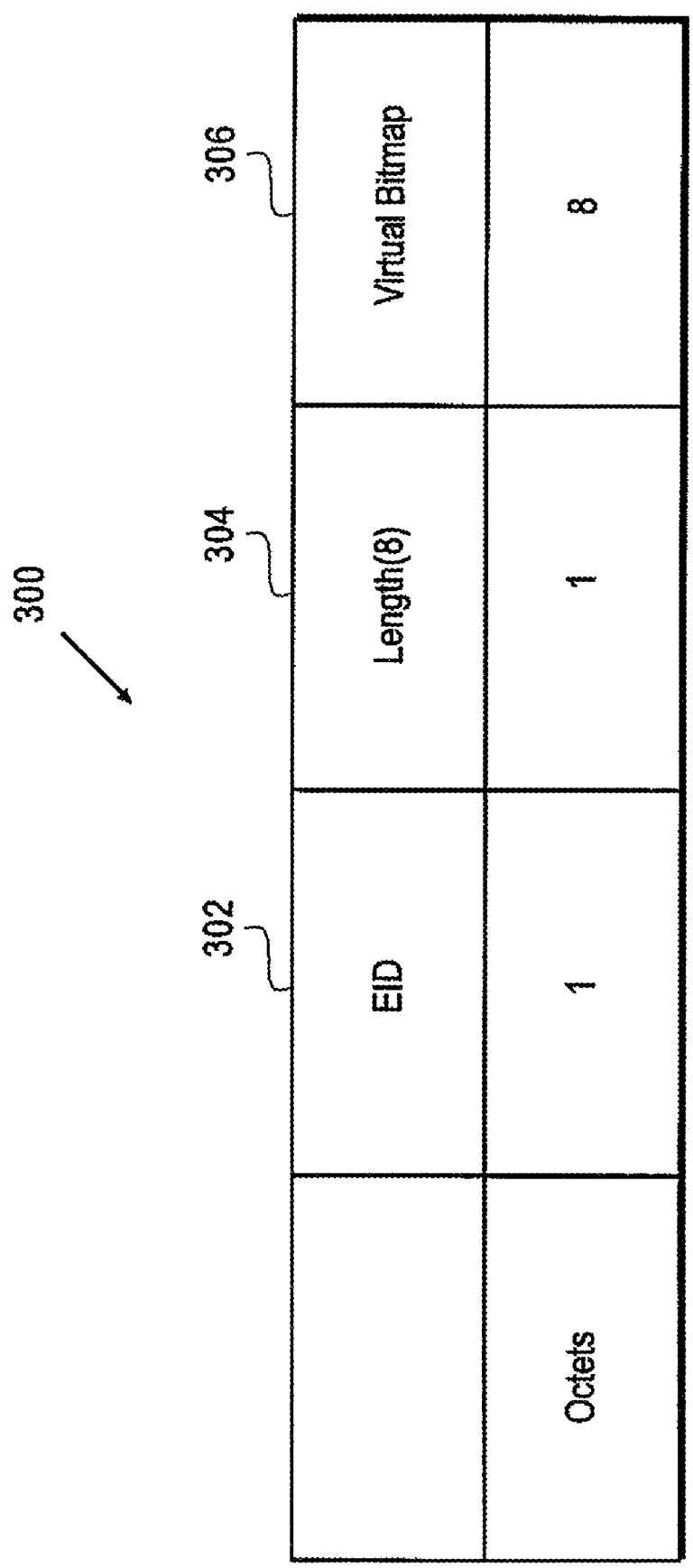
FIG. 3 is schematic diagram representation for a paging bitmap for a paging indication message for a wireless network in accordance with various embodiments of the present invention.

In accordance with various embodiments of the present invention, an example of a paging bitmap may be described with reference to FIG. 3. As may be seen in FIG. 3, a paging bitmap 300 includes a field 302 for identification, a field 304 indicating a length for the paging bitmap and a field 306 for the paging bit map itself. As an example, the identification field may be one octet (8 bits), the field for the length may also be one octet, while the paging bitmap field may be eight octets. Thus, in this example, the paging bitmap includes 64 bits and is organized into eight octets such that bit number N ($0 \leq N \leq 64$) in the bitmap corresponds to bit number (N mod 8) in octet number [N/8]. The low-order bit of each octet is bit number 0 and the high order bit of each octet is bit number 7. Each bit in the paging bitmap corresponds to a paging index for one or more STAs within the basic service set of the paging service. Bit number N is 0 if there are no pages for a STA whose paging index is represented by N. If any paging frames for that STA arrive at the paging service, then bit number N in the paging bitmap is 1. The paging index may be set with a derivation function which may use as its input at least one of the Key ID for a STA, or a STA MAC address. For example, paging index=Hash (6 bits, 2 bytes of Key ID). The Key ID identifies the previously described IPTK between the paging service and an STA. Thus, the paging index has at least one of an obfuscated key identification identifying the IPTK between the paging service and an STA, or obfuscated STA MAC address.

Thus, depending upon the derivation function used to create the paging bitmap and the Key IDs of various STAs, multiple STAs may have the same paging index. Accordingly, during a paging interval, upon receipt of a paging indication message, the paging bitmap may be used by a STA to determine whether it may be being paged. If the STA finds its paging index bit is 1, then the STA searches through the list of paged station indication elements with the paging indication message to find its specific page information, if there is any. The list of paged station indication elements may use the Key ID as its index. When the paged station indication elements are indexed by the Key ID, a binary search may be applied in order to sort through the list.

If no STA is being paged during a paging interval, the paging bitmap element and paging station indication element may not be present in a paging indication frame, in accordance with various embodiments of the present invention. This may prevent the need to "zero" out the paging bitmap.

Figure 4:
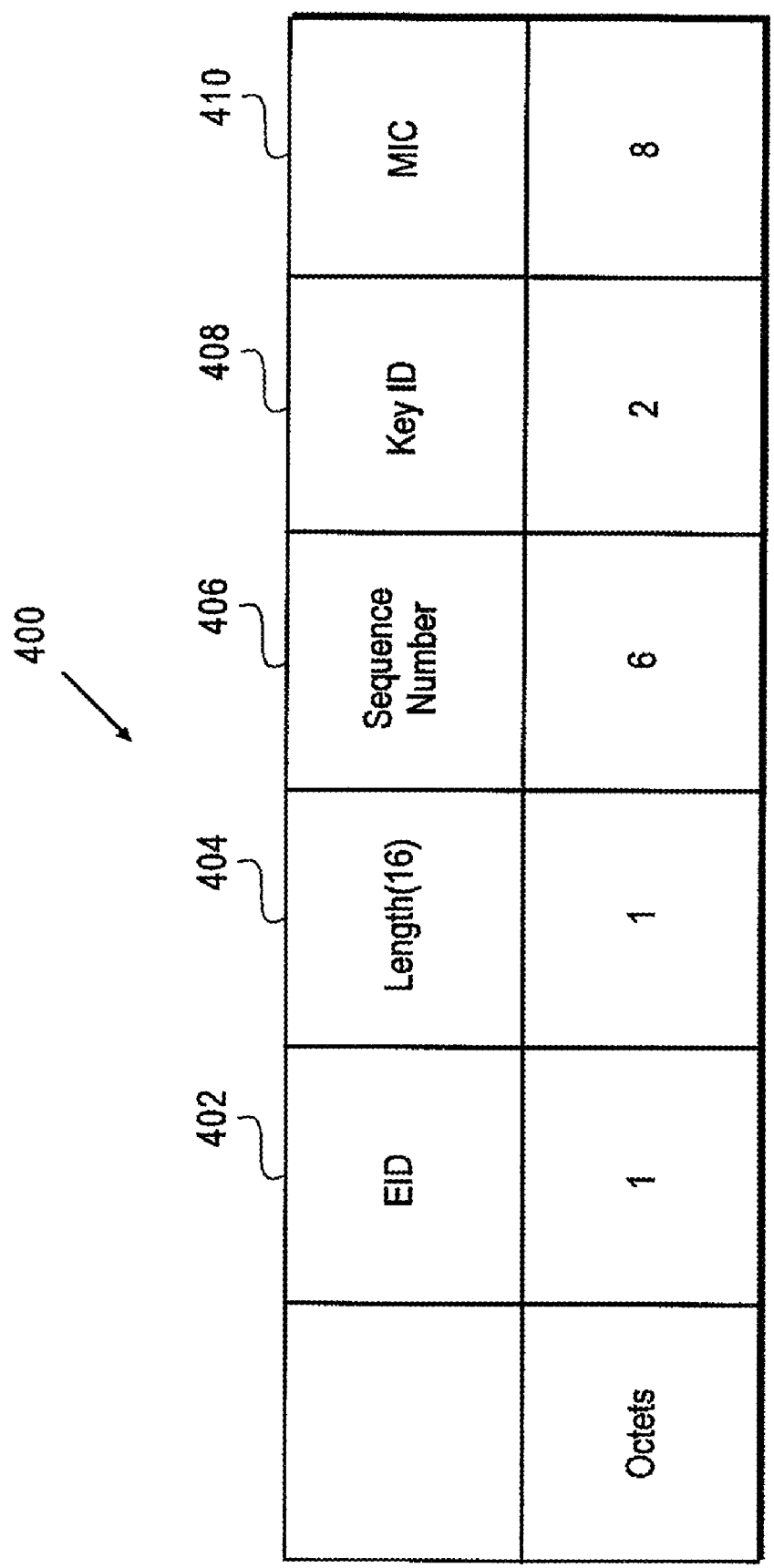
FIG. 4 is schematic diagram representation for a paged station indication element for a paging indication message for a wireless network in accordance with various embodiments of the present invention.

As may be seen in FIG. 4, a paged station indication element 400, in accordance with various embodiments of the present invention, includes several fields. One field 402 may be for the identification, while another field 404 may be for the length. A sequence number field 406, a Key ID field 408, and a message integrity code (MIC) field 410 may also be provided. As an example, the identification field may be one octet, the length field may be one octet, the sequence number field may be six octets, the Key ID field may be two octets, and the MIC field may be eight octets. In accordance with various embodiments of the present invention, the sequence number field provides replay protection while the Key ID field identifies the IPTK between the paging service and STA used to compute the MIC. As previously noted, the IPTK is derived from the MSK. The MIC field may contain a MIC calculated over the entire paging bitmap information element and all of the preceded fields in the paged station indication information element.

Figure 5:
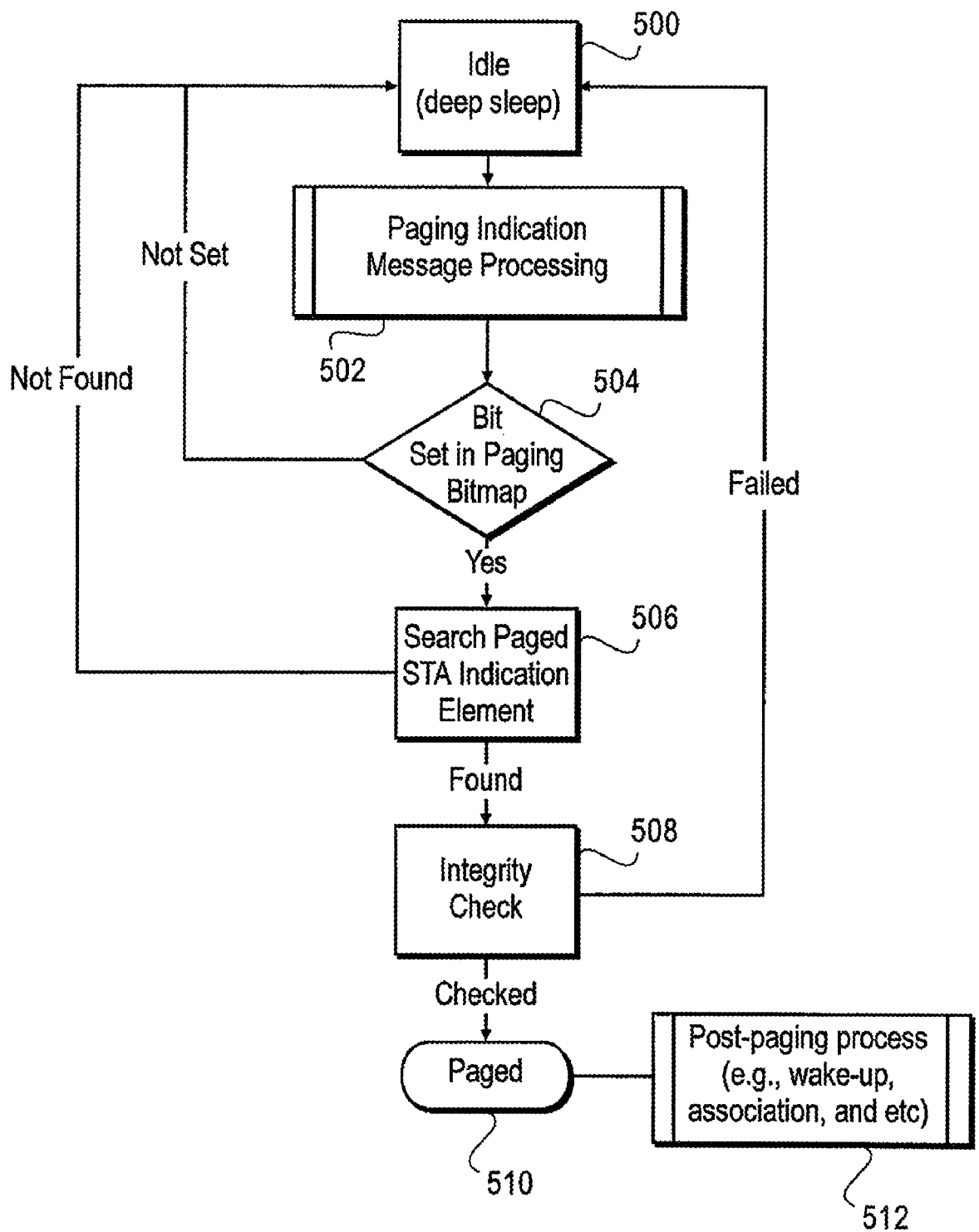
FIG. 5 is a flowchart illustrating an example of a protected paging mechanism for a wireless network in accordance with various embodiments of the present invention.

Thus, with reference to FIG. 5, it may be seen that a STA enters an paging mode (becomes idle) at 500. During a paging interval, the STA temporarily or partially awakens in order to process a paging indication message at 502. The STA checks the appropriate bit in the paging bitmap at 504. If it is not set, i.e., has a value of zero, then the STA remains idle since the STA is not being paged. If the bit is set, i.e., has a value of 1, then the STA searches the paged station indication elements at 506 in order to determine if indeed the STA is being paged. If no paged station indication elements are found for the STA, then the STA remains idle. If a paged station indication element is found for the STA, then the STA performs an integrity check at 508. If the integrity check fails, then the STA remains in the idle mode. If the integrity check passes, then the STA is indeed being paged at 510 and the STA exits the idle mode and "wakes up" at 512.

Figure 6:
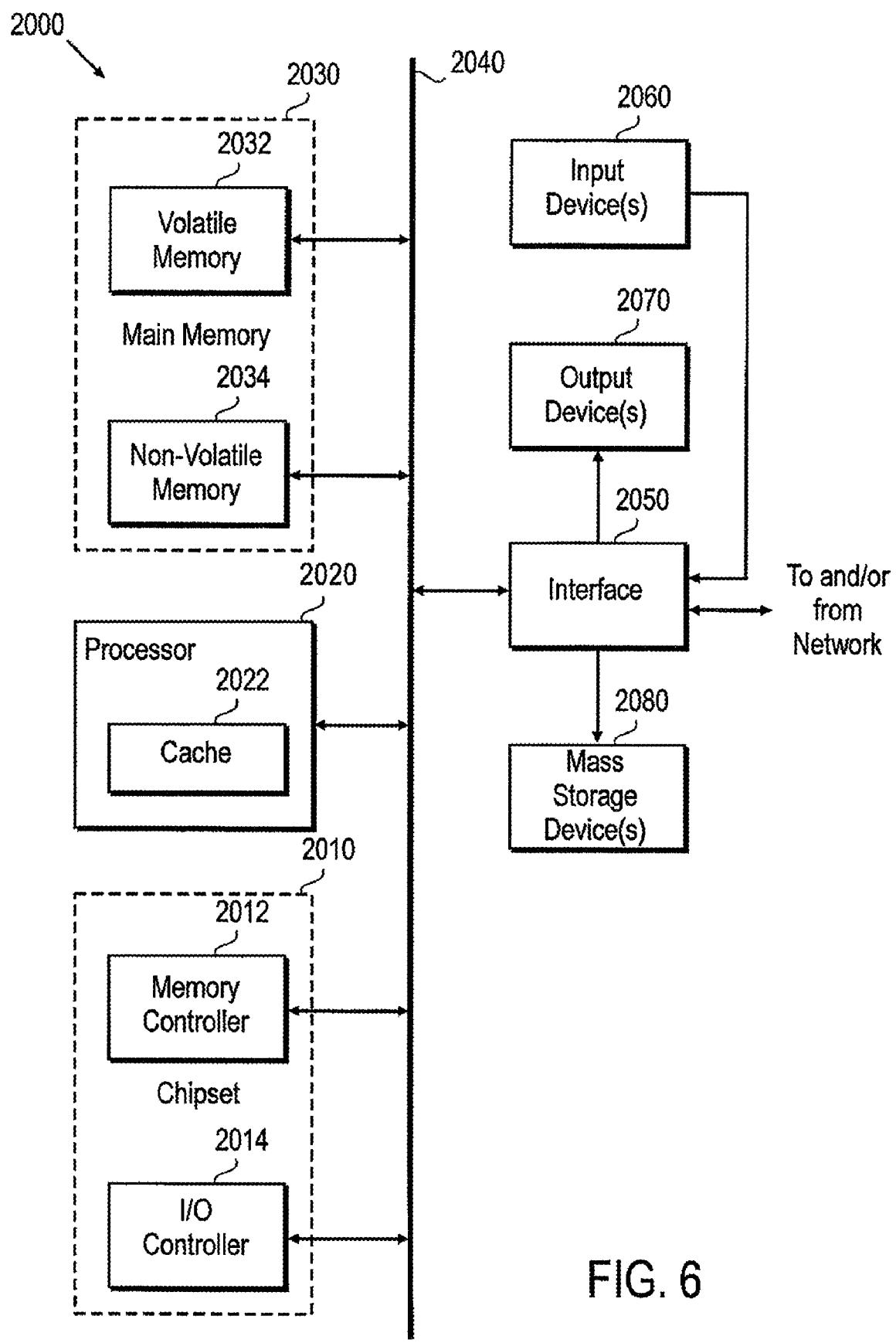
FIG. 6 is a block diagram representation of an example processor system that may be used to practice various aspects of the present invention.

FIG. 6 is a block diagram of an example processor system 2000 adapted to implement the methods and apparatus disclosed herein, in accordance with various embodiments. The processor system 2000 may be a desktop computer, a laptop computer, a handheld computer, a tablet computer, a PDA, a server, an Internet appliance, and/or any other type of computing device. The processor system 2000 may be used as a STA, an AP, or a server hosting the paging service function.

The processor system 2000 illustrated in FIG. 6 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The chipset 2010 may be implemented using one or more Wireless Personal Area Network (WPAN) components, Wireless Local Area Network (WLAN) components, Wireless Metropolitan Area Network (WMAN) components, Wireless Wide Area Network (WWAN) components, and/or other suitable networking components. In particular, in various embodiments designed to be a STA or a paging service, the chipset 2010 may be endowed with the teachings of the present invention, implementing selected aspects of the above described paging mechanism. The processor 2020 may be implemented using one or more processors, e.g. those of the Intel® Core™ technology, Intel® Pentium® technology, the Intel® Itanium® technology, the Intel® Centrino™ technology, the Intel® Core™ Duo technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device. In various embodiments designed to be used as a server, suitable for hosting the above described paging service function, main memory 2030 may include (a non-persistent copy of the) instructions implementing all or portions of the above described paging service function.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface. In various embodiments designed to be a STA or AP, selected aspects of the above described paging mechanism may be implemented in interface circuit 2050, in addition to or in lieu of the endowment in chipset 2010.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives. In various embodiments designed to be used as a server, suitable for hosting the above described paging service function, mass storage device(s) may include (a non-persistent copy of the) instructions implementing all or portions of the above described paging service function.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   generating, by a paging service, a paging indication message (PIM) having at least one paging index that indicates whether at least one of a plurality of stations (STA) may be being paged, the at least one paging index having at least one of obfuscated key identification identifying an integrity pairwise temporal key (IPTK) between the paging service and an STA, or obfuscated STA medium access control (MAC) address, wherein the IPTK is generated via a key derivation function from a service pairwise key (SPK) that is derived from a mobile station key (MSK); and
   transmitting, by the paging service, the PIM to the STA.

2. The method of claim 1, wherein generating the PIM comprises generating the PIM to have a plurality of paging indices.

3. The method of claim 2, further comprising generating, by the paging service, a paging bitmap that represents the plurality of paging indices, wherein the PIM includes the paging bitmap.

4. The method of claim 3, wherein generating the paging bitmap comprises using a function with an input of at least a portion of the IPTK.

5. The method of claim 4, wherein generating the paging bitmap comprises using ate least one of an identification for an IPTK or a STA MAC address.

6. The method of claim 5, wherein the identification comprises 2 bytes.

7. The method of claim 6, wherein generating the paging bitmap comprises generating a paging bitmap comprising at least 64 bits.

8. The method claim 1, further comprising transmitting within the PIM specific paging information indicating which specific STAs within the plurality of STAs are actually being paged.

9. The method of claim 8, further comprising transmitting within the PIM a message integrity code.

10. The method of claim 8, further comprising transmitting within the PIM a sequence number.

11. An article of manufacture comprising:
    a storage medium; and
    a plurality of instructions stored in the storage medium and designed to enable an access point (AP) to perform a plurality of AP operations, a station (STA) to perform a plurality of STA operations, or both;
    the plurality of AP operations including:
       receiving from a paging service within a network comprising a plurality of STAs, a paging indication message (PIM) comprising at least one paging index that indicates whether at least one STA may be being paged, the at least one paging index having at least one of obfuscated key identification identifying an integrity pairwise temporal key (IPTK) between the paging service and an STA, or obfuscated STA medium access control (MAC) address, wherein the IPTK is generated via a key derivation function from a service pairwise key (SPK) that is derived from a mobile station key (MSK), the PIM further including at least one paged indication element for an STA within the plurality of STAs indicating that the STA is actually being paged; and
       transmitting the PIM to the plurality of STAs;
    the plurality of STA operations including:
       receiving the PIM from at least one AP; and
       interpreting the PIM to determine if the STA may be being paged.

12. The article of manufacture of claim 11, wherein the plurality of instructions are further designed to enable the STA to interpret the PIM to determine if the STA is actually being paged and to determine whether to exit a paging mode and resume communication within a network.

13. The article of manufacture of claim 11, wherein the PIM comprises a paging bitmap that represents a plurality of paging indices, and wherein the plurality of instructions are further designed to enable the STA to interpret the paging bitmap in order to determine if the STA may be being paged.

14. The article of manufacture of claim 13, wherein the plurality of instructions are further designed to enable the STA to determine if the PIM includes a page for the STA, to verify a message integrity code within the PIM to determine whether the PIM is trustworthy, and to determine whether to exit a paging mode and resume communication within the network.

15. The article of manufacture of claim 14, wherein the plurality of instructions are further designed to enable the STA to verify a sequence number within the PIM to determine whether the paging indication message is replayed.

16. A system comprising:
    an omnidirectional antenna; and
    a paging service operatively coupled to the antenna to control paging of stations (STAs) within one or more paging groups, the paging service being adapted to generate a paging indication message (PIM) comprising at least one paging index for at least one of the STAs and to transmit the PIM, the at least one paging index having at least one of obfuscated key identification identifying an integrity pairwise temporal key (IPTK) between the paging service and an STA, wherein the IPTK is generated via a key derivation function from a service pairwise key (SPK) that is derived from a mobile station key (MSK), or obfuscated STA medium access control (MAC) address.

17. The system of claim 16, wherein the paging service is adapted to generate the PIM to include a paging bitmap that includes a plurality of bits that represent a plurality of paging indices.

18. The system of claim 16, wherein the paging service is adapted to generate the PIM to include specific paging information indicating which specific STAs are being paged.

19. The system of claim 16, wherein the paging service is adapted to generate the PIM to include a message integrity code.

20. The system of claim 16, wherein the paging service is adapted to generate the PIM to include a sequence number.

* * * * *